US012222049B2

(12) United States Patent
Rosenthal et al.

(10) Patent No.: US 12,222,049 B2
(45) Date of Patent: Feb. 11, 2025

(54) PRESS CONNECTION SYSTEM FOR THE NON-RELEASABLE CONNECTION OF A FITTING AND FITTING

(71) Applicant: Viega Technology GmbH & Co. KG, Attendorn (DE)

(72) Inventors: Jörg Rosenthal, Reichshof-Eckenhagen (DE); Ulrich Arning, Attendorn (DE); Bernd Franke, Finnentrop-Schoenholthausen (DE)

(73) Assignee: Viega Technology GmbH & Co. KG, Attendorn (DE)

( * ) Notice: Subject to any disclaimer, the term of this patent is extended or adjusted under 35 U.S.C. 154(b) by 0 days.

(21) Appl. No.: 18/569,937

(22) PCT Filed: Jun. 14, 2022

(86) PCT No.: PCT/EP2022/066168
§ 371 (c)(1),
(2) Date: Dec. 13, 2023

(87) PCT Pub. No.: WO2022/263443
PCT Pub. Date: Dec. 22, 2022

(65) Prior Publication Data
US 2024/0229984 A1 Jul. 11, 2024

(30) Foreign Application Priority Data
Jun. 14, 2021 (DE) ..................... 10 2021 115 306.9

(51) Int. Cl.
*F16L 13/14* (2006.01)
*B25B 27/10* (2006.01)

(52) U.S. Cl.
CPC ............. *F16L 13/142* (2013.01); *B25B 27/10* (2013.01); *F16L 13/14* (2013.01); *F16L 13/141* (2013.01); *F16L 2013/145* (2013.01)

(58) Field of Classification Search
CPC ....... F16L 13/142; F16L 13/14; F16L 13/141; F16L 2013/145; B25B 27/10
See application file for complete search history.

(56) References Cited

U.S. PATENT DOCUMENTS 6,805,385 B2 10/2004 Viegener
9,234,611 B2 1/2016 Arning et al.
(Continued)

FOREIGN PATENT DOCUMENTS

DE 29721760 U1 3/1998
DE 102009007303 A1 8/2010
(Continued)

*Primary Examiner* — William S. Choi
(74) *Attorney, Agent, or Firm* — The Webb Law Firm

(57) ABSTRACT

A press connection system for non-releasably connecting a fitting to a pipe, with a press jaw, with a press contour formed on the inside of the press jaw. The press contour has a cylindrical press section, with a fitting, with a fitting base body and a press sleeve forming a press chamber. A sealing ring is arranged at the proximal end of the press chamber relative to the fitting base body and a cutting ring is arranged at the distal end of the press chamber relative to the fitting base body. The cutting ring has a central cylindrical section and cutting elements arranged at the distal end and cutting elements arranged at the proximal end. Also a swaged fitting.

2 Claims, 7 Drawing Sheets

(56) References Cited

U.S. PATENT DOCUMENTS

| | | | |
|---|---|---|---|
| 9,664,316 | B1 | 5/2017 | Crompton et al. |
| 10,844,981 | B2 | 11/2020 | Ruissen et al. |
| 2011/0049875 | A1* | 3/2011 | Stults ................... F16L 13/142 |
| 2012/0001414 | A1 | 1/2012 | Arning et al. |
| 2013/0292939 | A1 | 11/2013 | Arning et al. |
| 2019/0024827 | A1 | 1/2019 | Ruissen et al. |
| 2019/0067922 | A1* | 2/2019 | Platt ..................... F16L 13/142 |
| 2019/0170277 | A1 | 6/2019 | Kost et al. |
| 2020/0109805 | A1* | 4/2020 | He ....................... F16L 13/142 |

FOREIGN PATENT DOCUMENTS

| | | |
|---|---|---|
| DE | 102016109034 A1 | 11/2017 |
| EP | 2394087 B1 | 4/2018 |
| WO | 2017043966 A1 | 3/2017 |
| WO | 2018085185 A1 | 5/2018 |

\* cited by examiner

PRESS CONNECTION SYSTEM FOR THE NON-RELEASABLE CONNECTION OF A FITTING AND FITTING

CROSS-REFERENCE TO RELATED APPLICATIONS

This application is the United States national phase of International Application No. PCT/EP2022/066168 filed Jun. 14, 2022, and claims priority to German Patent Application No. 10 2021 115 306.9 filed Jun. 14, 2021, the disclosures of which are hereby incorporated by reference in their entireties.

BACKGROUND OF THE INVENTION

Field of the Invention

The invention relates to a press-fitting system for non-releasably connecting a fitting to a pipe, with a press jaw, with a press contour formed on the inside of the press jaw, wherein the press contour has a cylindrical press section, with a fitting, with a fitting base body and a press sleeve forming a press chamber, wherein a sealing ring is arranged at the proximal end of the press chamber relative to the fitting base body and a cutting ring is arranged at the distal end of the press chamber relative to the fitting base body, and wherein the cutting ring has a central cylindrical portion, cutting elements disposed at the distal end and cutting elements disposed at the proximal end. The invention also relates to an aforementioned fitting in the compressed state.

Description of Related Art

The technical field relevant to the present invention is the on-site installation of piping systems, in which a piping system consisting of pipe sections and fittings is generally installed for conducting and guiding a fluid, i.e. a liquid or a gas. A fitting is generally understood to be a connector for a pipeline, and a fitting is most commonly used to connect two or more pipe sections. Accordingly, the fitting preferably has two or more compression sections, for example in the form of compression sleeves. The most common fittings include straight connections, changes of direction in the form of pipe bends, reducers, branches such as T-pieces or crossings. However, a fitting is also understood to be a pipe connection of a fitting or other component. For example, thermometers or pressure gauges as armatures have only one connection for a pipe section. Thus, the fitting of an armature only has a press section to connect a pipe section to the fitting.

For connecting the pipe sections with the fittings and other components, press connections are used in which a press section of a fitting, for example in the form of a press sleeve, is formed radially inwards by means of a press jaw when the pipe section is inserted so that a permanent, tight and non-detachable connection is produced. An undetachable connection is understood to be a connection between a fitting and a pipe that can only be dismantled by at least partially destroying the components that are connected to each other.

Pressing techniques for radial forming of the press section are mainly radial-acting pressing systems as well as pressing systems that use radial-axial pressing, wherein a part of the fitting is axially displaced during the pressing process in order to effect radial forming.

The piping systems described above are used in particular to transport drinking or heating water, gas for operating a heating system or industrial gases. In principle, any fluid medium can be transported in the pipelines.

The fittings and pipes are preferably made of solid or high-strength materials, preferably metals and alloys, in particular comprising copper, nickel and/or steel.

The press jaw can be designed in different shapes. On the one hand, the press jaw can have two press jaw inserts in lever form without or with an additional press element in the form of a wedge. On the other hand, the press jaw can have two, preferably round press jaw inserts without or with an additional press element in the form of a wedge. Furthermore, a press jaw can be designed as a press loop or press chain consisting of three or more, preferably round, press jaw inserts without or with an additional press element in the form of a wedge.

A press jaw usually has two press jaw inserts in lever form without or with an additional press element in the form of a wedge. A press ring, on the other hand, can consist of two, preferably round press jaw inserts without or with an additional press element (press jaw without/with wedge).

A pressing sling or pressing chain consists of three or more rounded press jaw inserts without or with additional pressing element (press jaw without/with wedge).

Furthermore, in a preferred manner, a separating ring is arranged between the cutting ring and the sealing ring, which creates a distance between the cutting ring and the sealing ring and prevents damage to the sealing ring by the cutting elements of the cutting ring. However, the arrangement of a separating ring is not necessary.

During pressing, the press jaw presses the press sleeve and thus the sealing ring and the cutting ring radially uniformly inwards by a radially inward movement with the cylindrical press section. Thus, the cutting elements penetrate the material of the tube with essentially the same depth.

The penetration of the cutting elements into the material of the pipe causes a fixing of the pipe relative to the fitting in both axial directions. In part, the penetration of the cutting elements also acts as an anti-rotation device. The securing of the axial position is, among other things, for the protection against a bursting of the non-detachable connection in case of a too strong mechanical load, be it due to a too high internal pressure of the guided medium or due to a mechanical impact from the outside.

Test trials have shown that the fittings used so far can withstand high mechanical loads, such as axial and radial impact tests. Nevertheless, the fittings must also withstand extreme stresses in specific applications.

SUMMARY OF THE INVENTION

Therefore, the present invention is based on the technical problem of further improving the pull-out protection and burst resistance of the pressed fitting.

According to the invention, the aforementioned technical problem is solved in a press-fitting system afore mentioned in that the press contour has a distal press section adjacent to the cylindrical press section, which is conical at least in sections, and a proximal press section adjacent to the cylindrical press section, which is conical at least in sections, that the distal press portion is formed to reshape the distal end of the cutting ring radially inwardly when the press sleeve is pressed radially, that the cylindrical press portion is formed to reshape the proximal end of the cutting ring radially inwardly upon radial pressing of the press sleeve, and that the proximal press portion is formed to reshape the sealing ring radially inwardly when the press sleeve is pressed radially.

The system described above, after actuation of the press jaw, results in a pressed fitting which is non-detachably connected to a pipe, wherein, in the radially pressed state of the press sleeve, the distal end of the cutting ring is, at least in sections, deformed inwards to a radius smaller than the radius of the proximal end of the cutting ring and wherein the distal cutting elements have, at least in sections, penetrated deeper into the pipe than the proximal cutting elements.

The at least partially conical design of the press sections means that the press sections partially or fully assume the conical shape. A partial design can be achieved with circumferentially conically inwardly directed sections. According to the complete or partial distribution of the conical sections of the press section, the press sleeve is then formed to a smaller radius, at least in sections.

In the compressed state, the distal cutting elements have penetrated, at least in sections, deeper into the material of the tube than is the case for the proximal cutting elements. The section of the cutting ring, which is cylindrical before pressing and on which the distal cutting elements and the proximal cutting elements are arranged or formed, is brought into a conically tapering shape in the distal direction by the distal press section, which is conical at least in sections, together with the cylindrical press section.

The pull-out resistance of the connection between fitting and pipe is also preferably increased by the fact that the distal cutting elements are aligned in the proximal direction. Since the distal cutting elements have penetrated deeper into the pipe material than in conventionally pressed fittings, the pressed fitting has an increased resistance to pull-out forces and in particular to overpressure caused by the medium carried in the pipe.

BRIEF DESCRIPTION OF THE DRAWINGS

In the following, the invention is explained by means of an embodiment example with reference to the drawing. The drawing show FIG. 1 a section of a pressing system according to the invention before the pressing process, FIG. 2 the pressing system shown in FIG. 1 after the pressing process, FIG. 3 a side view of the press system according to FIG. 1, FIG. 4 the press system according to FIG. 1 in cross-section along line IV-IV in FIG. 3, FIG. 5 the press profile of the press jaw according to FIG. 1

DESCRIPTION OF THE INVENTION

An embodiment of a press-fit connection system according to the invention is explained below with reference to FIGS. 1 to 5.

Figure 3:
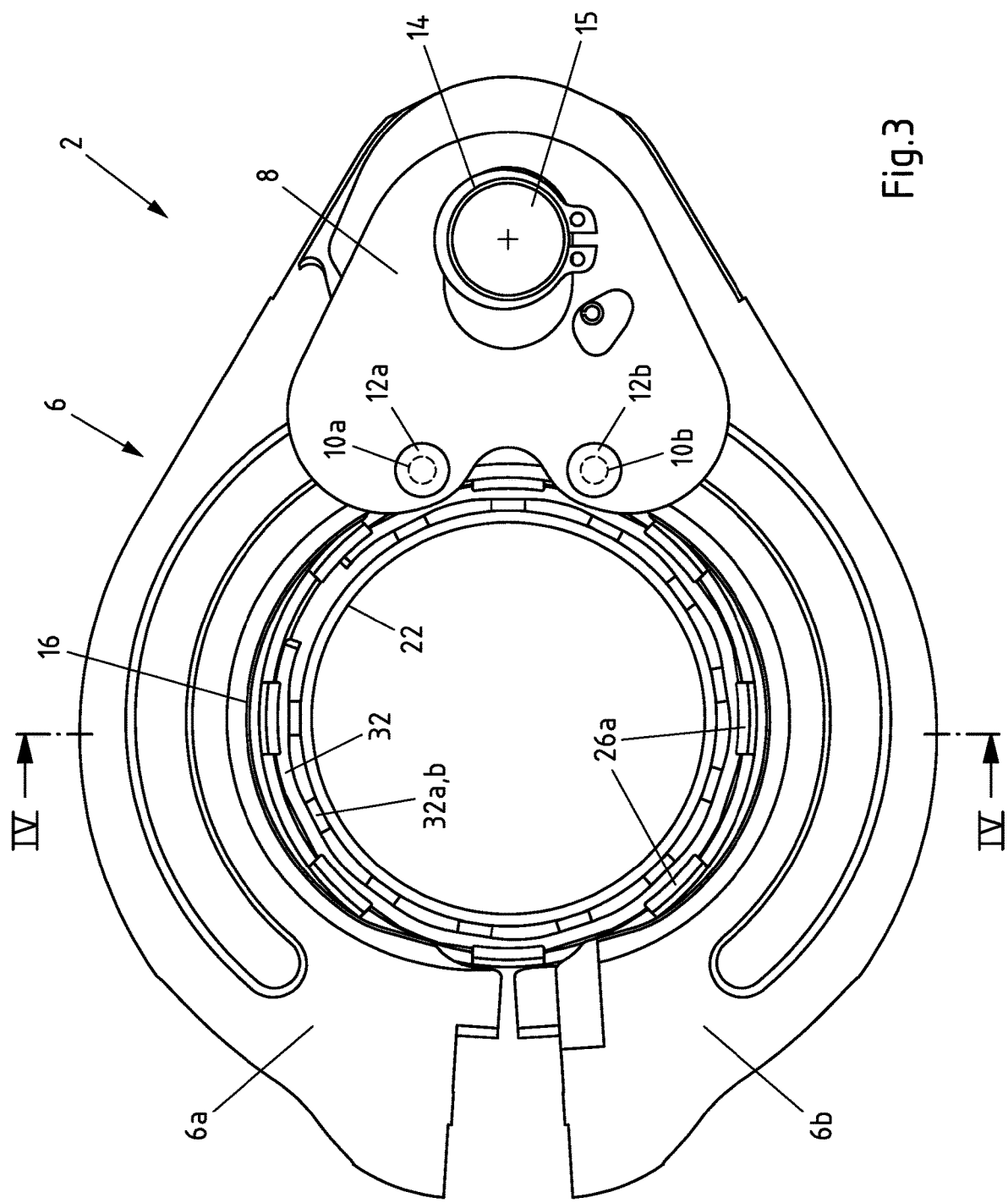
Figure 4:
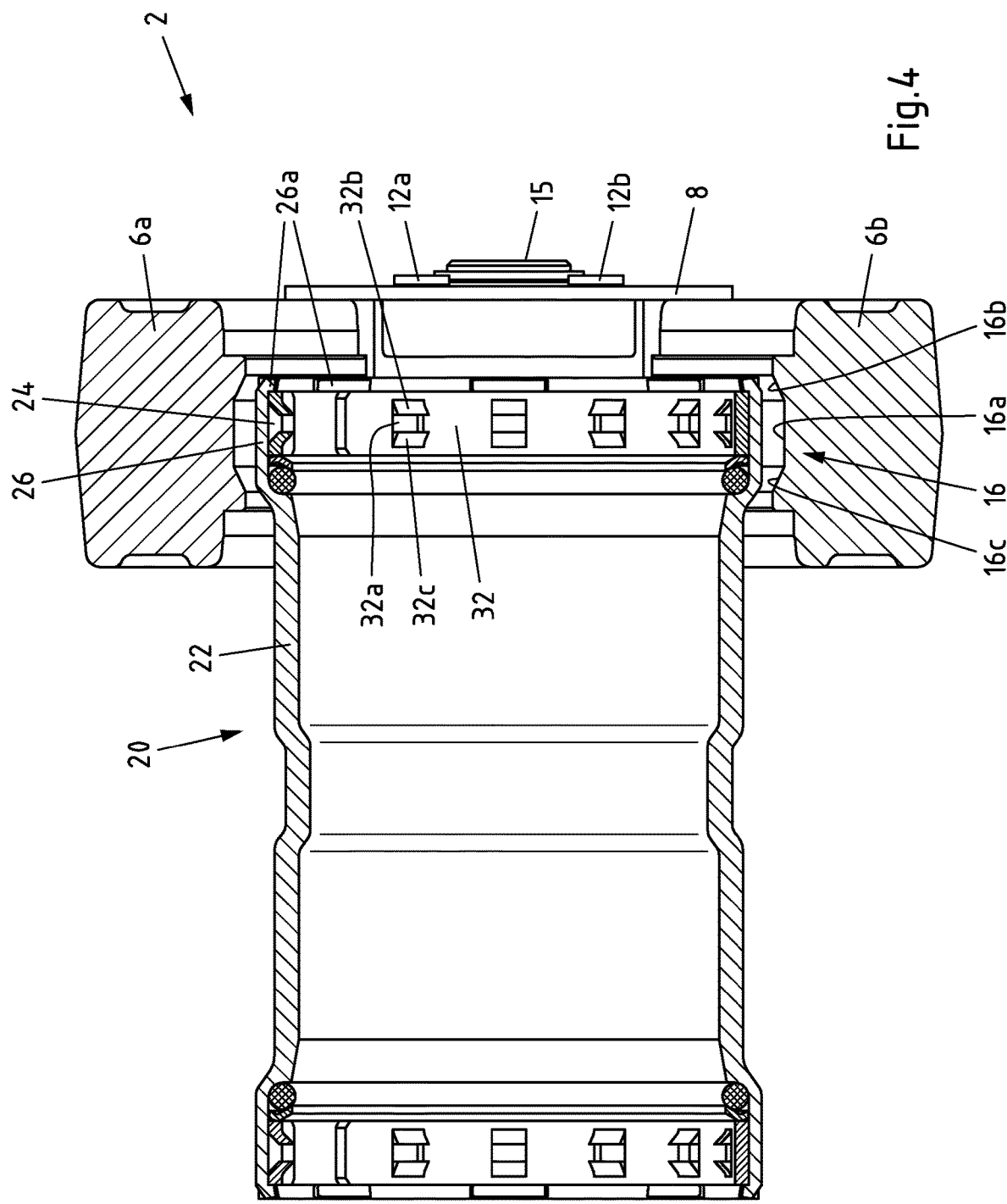
Figure 5:
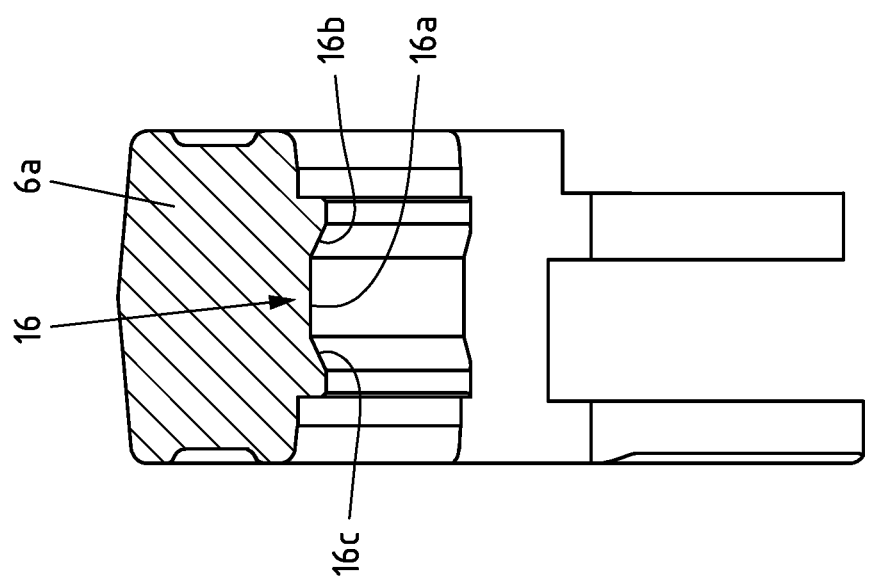

The press-fitting system 2 for the non-detachable connection of a fitting to a pipe 4 firstly has a press jaw 6 which consists of two press jaw halves 6a and 6b which are part of a press tool and are held by retaining lugs 8 arranged on both sides, see in particular FIGS. 3 and 4. The retaining lugs 8 have two bores 10a and 10b in which two shafts 12a and 12b are arranged to which the two press jaw halves 6a and 6b are pivotably attached. A further hole 14 for a fastening bolt 15 is also provided in the retaining lugs 8. The press jaw 6 is thus designed as a pressing loop which can be pressed together with a pressing tool at the open ends opposite the bore 14.

The drive mechanism of the pressing tool is in turn in operative connection with a pressing tool, which in particular has a double roller ram with two rollers. The double roller ram is in particular hydraulically or electrically driven, but the drive can also be realised by a toggle lever. The double roller plunger interacts with an inlet contour formed on the drive mechanism and presses the press jaw halves apart so that the press jaw halves are pressed together in the area of the press contour.

The press jaw 6 with the press jaw halves 6a and 6b has a press contour 16 on the inside, which initially has a cylindrical press section 16a.

Furthermore, the press-fit connection system 2 comprises a fitting 20, wherein the fitting 20 is formed with a fitting base body 22 and a press sleeve 26 comprising a press chamber 24. Within the press chamber 24, a sealing ring 28 is disposed at the proximal end 30 of the press chamber 24 relative to the fitting base body 22, and a cutting ring 32 is disposed at the distal end 34 of the press chamber 24 relative to the fitting base body 22. A separating ring 36 is also arranged between the sealing ring 28 and the cutting ring 32.

Circumferentially flanged sections 26a formed at the distal end of the press sleeve 26 serve to position the elements arranged in the press chamber 24.

The cutting ring 32 has a central cylindrical portion 32a, cutting elements 32b arranged at the distal end and cutting elements 32c arranged at the proximal end.

The press contour 16 further comprises a conical distal press section 16b adjacent to the cylindrical press section 16a and a conical proximal press section 16c adjacent to the cylindrical press section 16a. In this regard, the distal press section 16b is configured to reshape the distal end of the cutting ring 32 radially inwardly during radial pressing of the press sleeve 26 and thus the press chamber 24. The cylindrical press section 16a is further configured to radially inwardly form the proximal end of the cutting ring 32 during radial compression of the press sleeve 26, and the proximal press section 16c is configured to radially inwardly form the sealing ring 28 during radial compression of the press sleeve 26.

Figure 1:
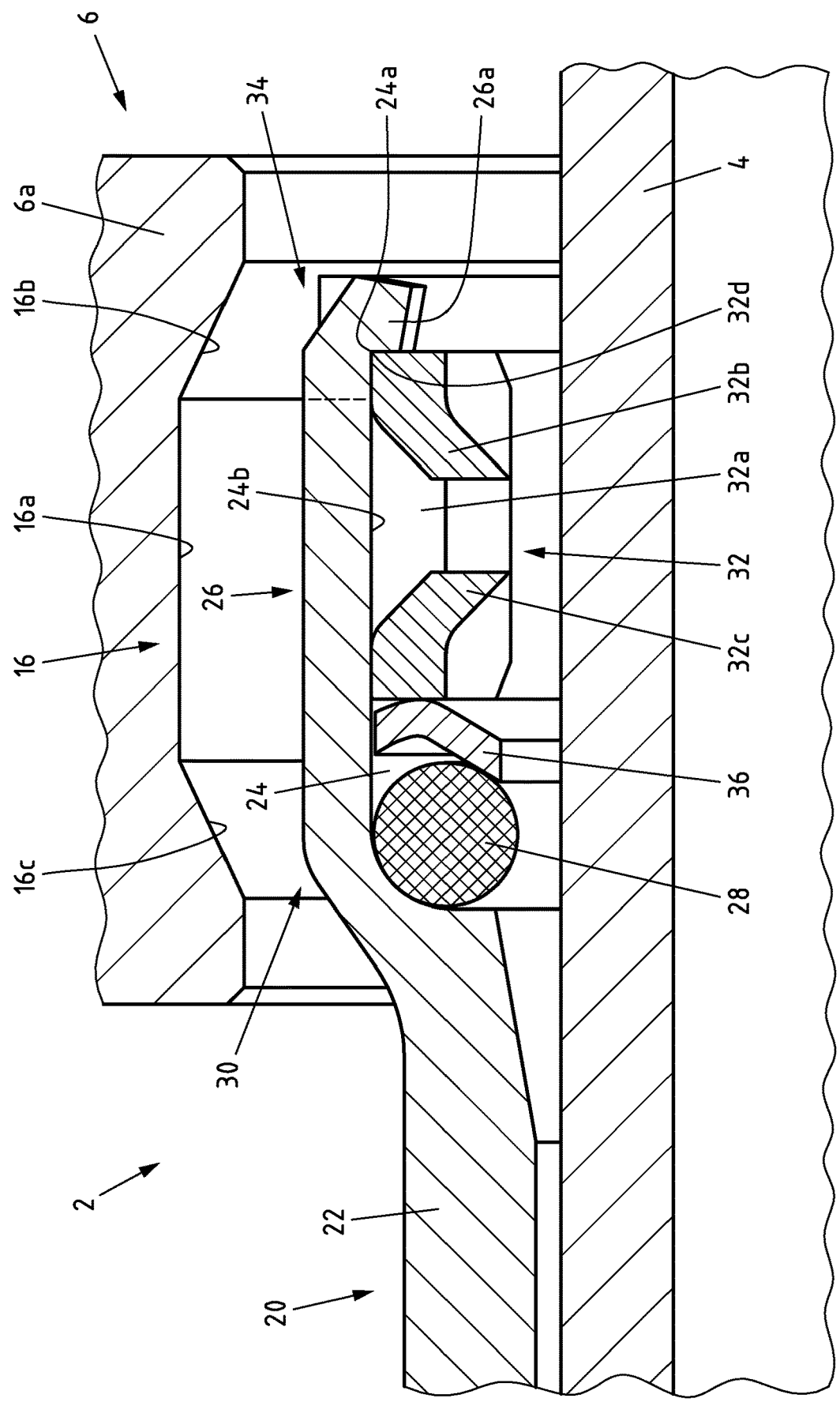

As can be seen from FIG. 1, the distal outer edge 32d of the cutting ring 32 abuts the inner edge 24a of the press chamber 24 and the cylindrical portion 32a of the cutting ring 32 abuts the cylindrical portion 24b of the press chamber 24. The position of the inner edge 24a is thereby distally outside the edge between the cylindrical press section 16a and the conical distal press section 16b shown by means of the dashed line. Therefore, the distal outer edge 32d of the cutting ring 32 is deformed further radially inwards than the proximal end of the cutting ring 32 by the press section 16a due to the conical shape of the press section 16b.

Figure 2:
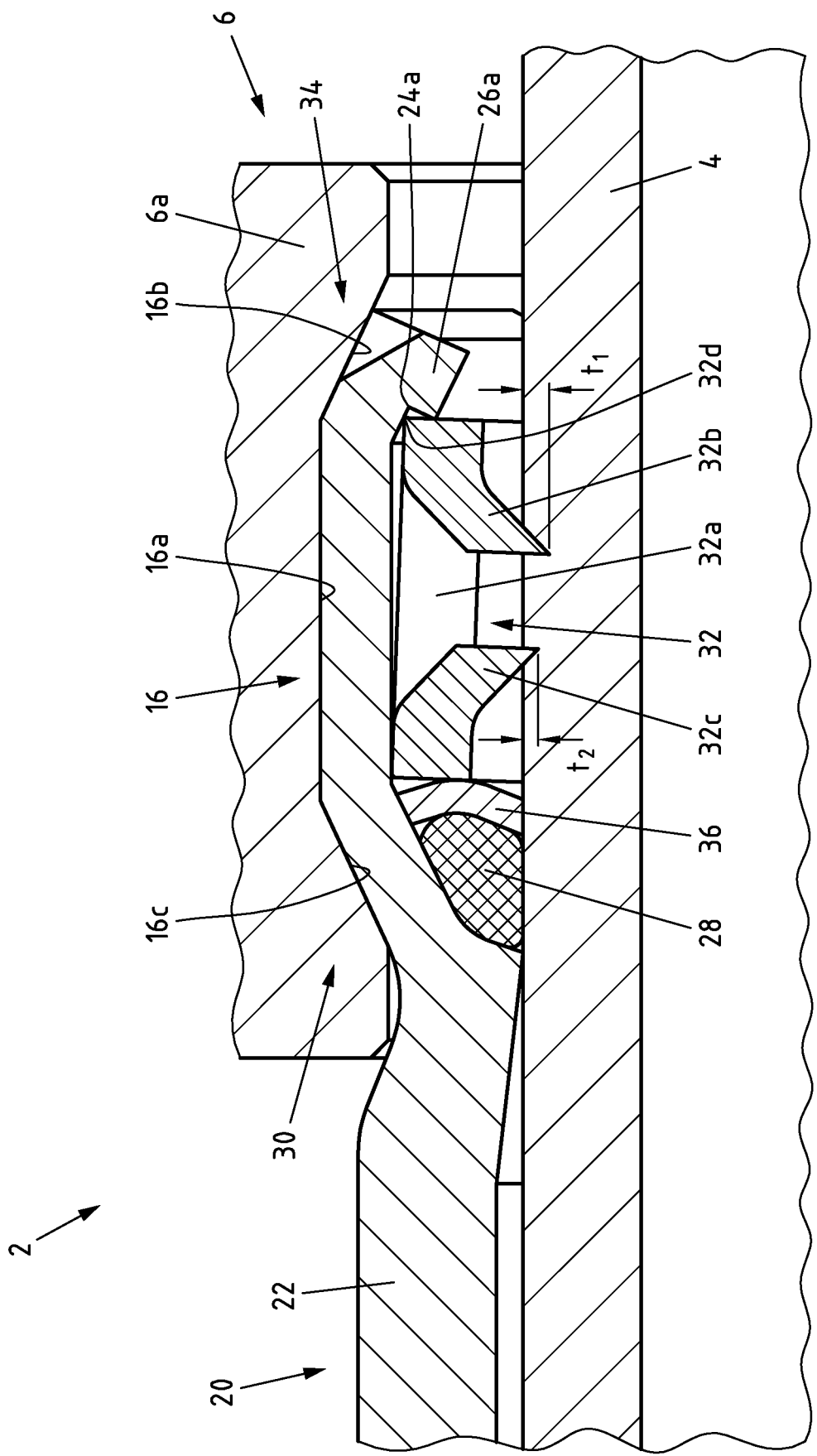

FIG. 1 shows the state of the press-fitting system 2 before pressing and FIG. 2 shows the state of the press-fitting system 2 and in particular of the fitting 20 after pressing with the pipe 4.

In the radially compressed state of the press sleeve 26, the cutting ring 32 and the sealing ring 28 as well as the separating ring 36 are deformed radially inwards and the cutting elements 32b and 32c have partially penetrated the tube 4 in the region of the cutting edge. Due to the conically formed press section 16b and the cylindrical press section 16a, in the radially pressed state of the press sleeve 26, the distal end of the cutting ring 32 is deformed inwards to a radius smaller than the radius of the proximal end of the cutting ring 32. As a result, the distal cutting elements 32b have penetrated deeper into the tube 4 than the proximal cutting elements 32.

In FIG. 2, the penetration depths $t_1$ and $t_2$ of the cutting elements 32b and 32c are drawn, and it applies that $t_1$ is greater than $t_2$. The asymmetrical radial deformation is also evident from the angle between the cylindrical section 32a of the cutting ring 32 and the cylindrical section 24b of the press chamber 24.

In addition, due to the design of the cutting elements 32b and 32c, it contributes to the improved holding force in the pull-out direction, to the right in FIGS. 1 and 2. The side of the cutting element 32b with the steep cutting edge directed against the pull-out direction contributes more to the holding force of the joint than the oblique cutting edge of the cutting element 32. Due to the tilting of the cutting ring 32 during pressing and the fact that the steep surface has a small angle to the vertical, there is an additional small force component that pulls the cutting ring 32 towards the tube 4. Additionally, slippage of the cutting ring 32 has become less likely because the sloping cutting edge of the cutting element 32c is more prone to lifting material from the tube 4, similar to a plough, as a result of the tilting angle of the cutting ring 32.

Overall, this provides a strengthened non-detachable connection between the fitting 20 and the pipe 4, as the cutting elements 32b act against the direction of extraction of the pipe 4 from the fitting 20 and penetrate deeper into the pipe 4 than in the prior art.

Figure 6:
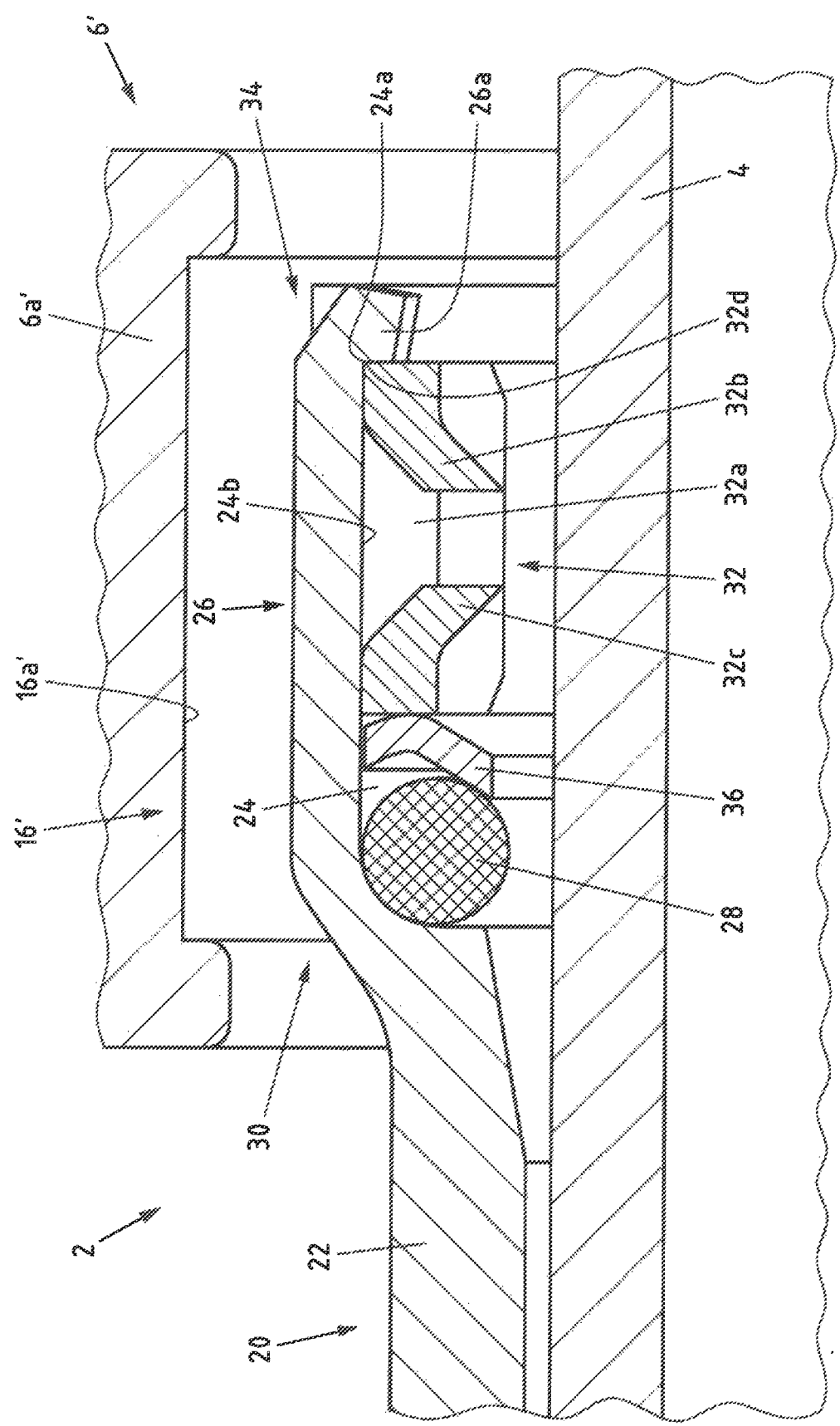
FIG. 6 a press system according to the state of the art before the pressing process in cross-section and FIG. 7 the pressing system shown in FIG. 6 after the pressing process.
Figure 7:
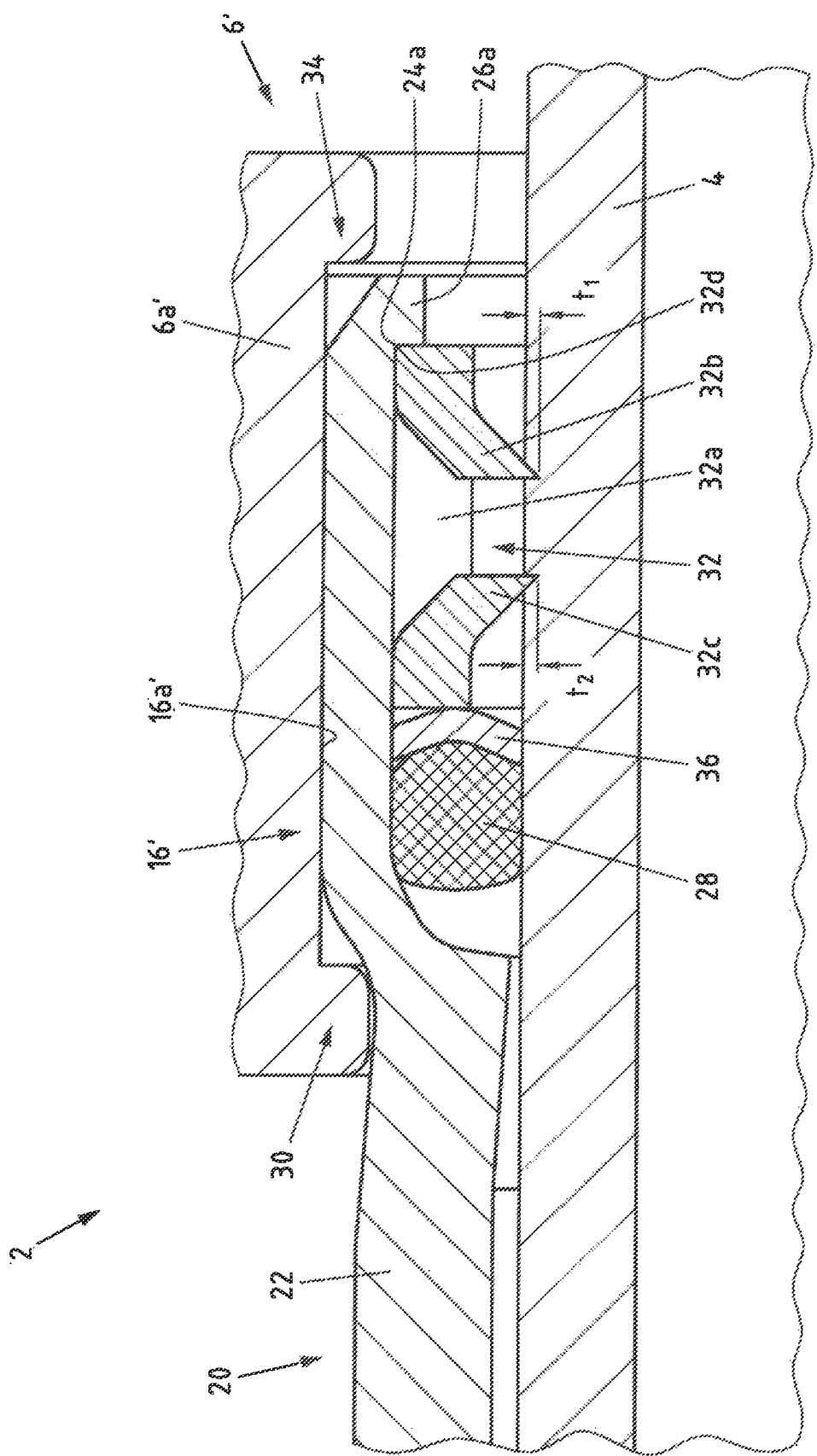

This becomes clear when comparing the previously described embodiment example of the press-fit connection system 2 according to FIG. 1 with the pressed fitting 20 according to FIG. 2 with the press-fit connection system 2' known from the prior art and shown in FIGS. 6 and 7.

The fitting 20 with its elements is identical to the embodiment example according to FIGS. 1 to 5. However, the press jaw 6' has a press contour 16' with only one cylindrical press section 16a', which altogether radially inwardly deforms the press sleeve 26 and thereby the sealing ring 28, the separating ring 28 and the cutting ring 32 in the same manner. Therefore, the cutting elements 32b and the cutting elements 32c have penetrated the material of the tube 4 to essentially the same depth. This is made clear by the penetration depths $t_1$ and $t_2$ of the cutting elements 32b and 32c shown in FIG. 7, which are of the same size.

The invention claimed is:

1. A press connection system for non-detachable connection of a fitting to a pipe, the press connection system comprising:
a press jaw,
a press contour formed on the inside of the press jaw,
wherein the press contour has a cylindrical press section,
the fitting,
a fitting base body and a press sleeve forming a press chamber,
wherein a sealing ring is arranged at a proximal end of the press chamber relative to the fitting base body and a cutting ring is arranged at a distal end of the press chamber relative to the fitting base body,
wherein the cutting ring has a central cylindrical portion, cutting elements disposed at the distal end and cutting elements disposed at the proximal end, and
wherein the press contour has a distal press section adjacent to the cylindrical press section, which is conical at least in sections, and a proximal press section adjacent to the cylindrical press section, which is conical at least in sections,
wherein
the distal press section asymmetrically reshapes a distal end of the cutting ring radially inwardly when the press sleeve is pressed radially,
the cylindrical press section asymmetrically reshapes a proximal end of the cutting ring radially inwardly upon the radial pressing of the press sleeve, and
the proximal press portion asymmetrically reshapes the sealing ring radially inwardly upon the radial pressing of the press sleeve.

2. A fitting in a pressed state, the fitting comprising:
a tube, which is connected non-detachably to the fitting,
a fitting base body and a press sleeve forming a press chamber,
wherein a sealing ring is disposed at a proximal end of the press chamber relative to the fitting base body and a cutting ring is disposed at a distal end of the press chamber relative to the fitting base body, and
wherein the cutting ring comprises a cylindrical portion and distal cutting elements disposed at the distal end and proximal cutting elements disposed at the proximal end,
wherein in the radially compressed state of the press sleeve the cutting ring and the sealing ring are deformed radially inwards and the distal and proximal cutting elements have partially penetrated the tube,
wherein in the radially compressed state of the press sleeve, a distal end of the cutting ring is deformed inwards, at least in sections, to a radius smaller than a radius of the proximal end of the cutting ring, and
that the distal cutting elements, at least in sections, have penetrated deeper into the tube than a proximal cutting elements.

* * * * *